G. FREEZE.
AUTOMATIC RAILROAD SWITCH.
APPLICATION FILED JUNE 29, 1920.

1,366,782.

Patented Jan. 25, 1921.
2 SHEETS—SHEET 1.

Inventor
Green Freeze

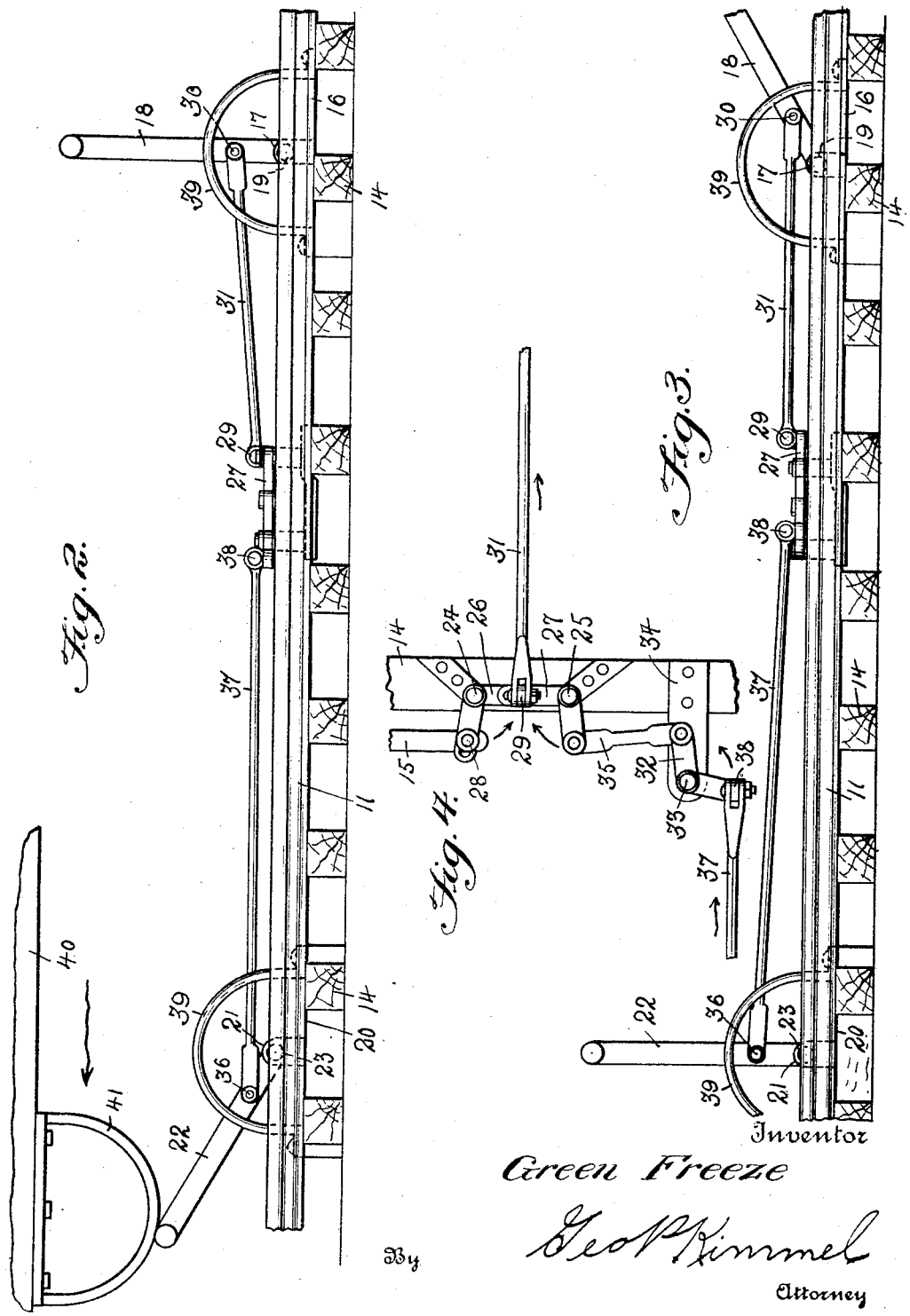

UNITED STATES PATENT OFFICE.

GREEN FREEZE, OF CLIFFORD, ILLINOIS, ASSIGNOR OF ONE-HALF TO JOHN DRAPER, OF CLIFFORD, ILLINOIS.

AUTOMATIC RAILROAD-SWITCH.

1,366,782.  Specification of Letters Patent.  Patented Jan. 25, 1921.

Application filed June 29, 1920. Serial No. 392,690.

*To all whom it may concern:*

Be it known that I, GREEN FREEZE, a citizen of the United States, residing at Clifford, in the county of Williamson and State of Illinois, have invented certain new and useful Improvements in Automatic Railroad-Switches, of which the following is a specification.

This invention relates to automatic railway switches, more particularly to devices of this character adapted for use in mines, and similar localities, and has for one of its objects to simplify and improve the construction, and increase the efficiency and utility of devices of this character.

Another object of the invention is to provide a device of this character having means whereby a car passing to the side track over the switch track, automatically sets the switch to "safety" for the track from which it has been switched, and with means whereby the car returning on the other line track opens the switch to the switch track.

Another object of the invention is to provide a device of this character having means whereby a car passing from one line track to the other, for instance from an "up" line track to a "down" line track, automatically sets a switch to prevent a following car from passing to said "down" line track until the first car has been returned past the switch track, and with means whereby the first car automatically opens the switch to the "down" line track to enable the following car to pass to the same, thus protecting the cars on the "down" line track until they have safely passed the danger point.

With these and other objects in view, the invention consists in certain novel features of construction as hereinafter shown and described and then specifically pointed out in the claims, and in the drawings illustrative of the preferred embodiment of the invention.

Figure 1 is a plan view of portions of the line tracks, a switch track connecting the line tracks, and the switch points, with the automatic switch operating mechanism applied.

Fig. 2 is an enlarged side elevation illustrating the positions of the trip devices when the switch is open, or set for the switch track as shown by full lines in Fig. 1.

Fig. 3 is a view similar to Fig. 2 illustrating the position of the trip devices when the switch is set for "safety" or closed for the line track with which it is associated, as shown by dotted lines in Fig. 1.

Fig. 4 is an enlarged plan view showing the system of levers between the switch points and the trip devices.

The improved apparatus includes two line tracks, a connecting switch track including switch points providing for transferring cars from one line track to the other.

The improved apparatus is designed for use more particularly in mines and similar localities where tracks substantially in parallel relation are employed, one track to carry the cars moving in one direction and usually called the "up" line and the other track for the cars moving in the opposite direction and usually called the "down" line, and for the purpose of this description the two lines will be thus designated, the "up" line being indicated as a whole by the character 10 and the "down" line as a whole by the character 11. The switch line connecting the "up" and "down" lines is designated as a whole by the character 12, and the switch points or switch rails by the character 13.

The ties which support the track rails are indicated at 14.

The switch points or rails 13 are connected together by a switch bar or rod 15, as shown.

Supported upon one or more of the ties 14 adjacent one of the rails of the switch track 12 is a base or bed member 16 having upstanding ears 17 in which a trip lever 18 is pivoted at one end at 19, the lever thus extending into the path of some portion of a car moving over the switch track.

Supported upon one or more of the ties 4 adjacent to one of the rails of the "down" track 11, is a base or bed member 20 having upstanding ears 21 between which a trip lever 22 is pivoted at 23.

Pivoted at 24 and 25 upon one of the ties 14, which is extended for that purpose, are bell crank levers 26 and 27, one arm of the lever 26 being coupled at 28 to the switch bar or rod 15, and the other arm of the lever 26 coupled at 29, to one arm of the lever 27.

Pivoted at one end at 30 to the trip lever 18 is a rod 31 with its other end connected to the uniting pivot 29 of the trip levers 26 and 27, as shown more clearly in Fig. 4.

A third bell crank lever 32 is pivoted at its elbow at 33 to a plate or bracket 34 extending from one of the ties 14, with one of its arms connected by a rod 35 to the other arm of the bell crank lever 27.

Pivoted at one end at 36 to the trip lever 22 is a rod 37 with its other end pivoted at 38 to the other arm of the bell crank lever 32.

Guard arches 39 are arranged to protect the trip levers 18 and 22 from lateral displacement.

The cars, a portion of the frame of one of which is indicated at 40 in Fig. 2, are each equipped with a trip lever actuating projection 41 which actuates the trip levers as the cars pass over the switch track and the "down" track.

With an apparatus thus constructed and arranged the operation is as follows:

A car having passed over the "down" line 11 in the direction of the arrow as shown in Fig. 2, its projection 41 engages the trip lever 22 and depresses it and by reason of its connection by the bell crank levers 26, 27 and 32, and rods 15, 35 and 37, with the switch points 13, moves the latter into open position so that the next car that passes over the "up" line 10 will be switched or "shunted" upon the switch track and thence to the "down" line.

The same movements of the bell crank levers 26 and 27 set the trip lever 18 into its upper or operative position, so that the projection 41 of the next car which passes over the switch track will engage the lever 18 and throw the switch points into closed position or at "safety" to prevent another car being switched upon the "down" line until the car which has been transferred thereto has been returned and engaged the trip lever 22 and again opened the switch to the switch track. Thus it will be impossible to run another car upon the "down" line until the car thereon has been moved out of the way. By this arrangement no danger exists of collision between the cars, as will be obvious.

If required a spring controlled guard rail or point 42 may be arranged as shown in Fig. 1.

The preferred embodiment of the invention is disclosed in the drawings and set forth in the specification, but it will be understood that any modifications within the scope of the claims may be made in the construction without departing from the principle of the invention or sacrificing any of its advantages.

What I claim is:

1. In a railway line, tracks for cars moving in opposite directions, a switch track connecting said line tracks and including switch points for guiding the cars from one of said line tracks to the switch track, a trip device in the path of cars on the other of said line tracks, a trip device in the path of the cars moving on said switch track, a switch bar connecting said switch points, a plurality of bell crank levers mounted for movement adjacent to said switch bar with one arm of one of said bell crank levers connected to said switch bar, a connecting rod between one of said trip devices and one coacting pair of said bell crank levers, a connecting rod between the other of said trip devices and another of said bell crank levers, and a connecting rod between one coacting pair of said bell crank levers.

2. In a railway, an up line track and a down line track, a switch track connecting said line tracks and including switch points for guiding cars from said up track to the switch track, a yieldable switch point between said switch track and the down line track and operating to retain the cars on the down track, a trip device in the path of cars on the down line tracks, a trip device in the path of the cars moving on said switch track, a switch bar connecting said switch points, and coupling means respectively between said switch bar and said trip devices.

In testimony whereof I affix my signature hereto.

GREEN $\times$ FREEZE.
his mark

Witnesses:
CLAUDE SMITH,
JOHN TERRY.